United States Patent
Clifford

[11] 3,781,561
[45] Dec. 25, 1973

[54] GRADIENT CONE THERMAL RADIATION SENSOR

[75] Inventor: Richard P. Clifford, Newport Beach, Calif.

[73] Assignee: TRW Inc., Redondo Beach, Calif.

[22] Filed: Oct. 29, 1971

[21] Appl. No.: 193,905

[52] U.S. Cl. .............................................. 250/352
[51] Int. Cl. .............................................. G01t 1/16
[58] Field of Search ...................... 250/83.3 H, 352; 73/355 R

[56] References Cited
UNITED STATES PATENTS

| | | | |
|---|---|---|---|
| 3,091,693 | 5/1963 | Rudomanski et al. | 250/83.3 H |
| 3,368,076 | 2/1968 | Clifford | 250/83.3 H |
| 3,465,149 | 9/1969 | Flint | 250/83.3 H |
| 3,600,581 | 8/1971 | Menke | 250/83.3 H |

Primary Examiner—James W. Lawrence
Assistant Examiner—Davis L. Willis
Attorney—Daniel T. Anderson et al.

[57] ABSTRACT

A conical cavity radiometer having a thin-walled thermal receptor cone secured about its open base end to a surrounding hollow heat sink which shields the cone against response to its ambient thermal environment and maintains the base end of the cone at an equilibrium temperature. Thermal radiation entering the open cone end creates a temperature differential between the cone ends proportional to the incident thermal radiation flux. This temperature differential is sensed by temperature sensors attached to the cone ends and is converted to an electrical signal which is an analog of the incident radiation flux. The radiometer is characterized by rapid attainment of thermal equilibrium, high sensitivity, and rapid response to changes in incident radiation flux.

3 Claims, 3 Drawing Figures

PATENTED DEC 25 1973 3,781,561

Richard P. Clifford
INVENTOR.

BY
Donald R. Nyhagen
ATTORNEY

GRADIENT CONE THERMAL RADIATION SENSOR

BACKGROUND OF THE INVENTION

1. Field of the Invention

This invention relates in general to radiant heat energy measuring devices or radiometers, and in particular to new and improved conical cavity radiometer which incorporates a heat sink to establish thermal equilibrium of the radiation receptor as distinguished from establishing thermal equilibrium solely by reradiation.

2. Prior Art

Radiometers and their characteristic advantages to measure thermal radiation are well-known. Examples of radiometers are found in U.S. Pat. Nos. 2,442,823; 3,073,163; 3,091,693; 3,131,304; 3,161,771; 3,188,473; 3,280626; 3,355,589; 3,368,076; 3,391,279; 3,401,263; and 3,461,290. One class of radiometers are known as conical cavity radiometers. These radiometers generally comprise a hollow internally blackened receptor cone open at its base end and mounted in such a manner that its inner surface is exposed to the radiant energy source to be measured so as to absorb incident radiant energy from the source and dissipate thermal energy by reradiation or by convection if the cone is in an unevacuated cell. When thus exposed to a source of radiation, the cone eventually reaches a state of thermal equilibrium wherein a thermal balance exists between the energy absorbed from the source and the energy dissipated by the cone. The temperature reached by the cone is a measure of the intensity of the radiant source. Means are provided in these prior art devices for sensing the temperature of the cone and thereby indirectly the temperature of the radiant source. Such measuring means usually comprise thermocouples or thermistors located midway between the base and the apex ends of the cone. Another prior art device senses the cone temperature by sensing the expansion and contraction of the cone element itself. In this latter device the base end of the cone is rigidly mounted and the apex end is free to move in response to the expansion and contraction of the cone. The position of the apex end then is a function of the temperature of the cone.

These prior art conical cavity radiometers, operating as they do on the principle of dissipation to their ambient environment of absorbed radiation from the thermal source, are necessarily quite sensitive to the ambient temperature for the reason that the energy dissipated to the ambient environment depends upon the temperature difference between the cone and the environment. Accordingly, the prior art radiometers are subject to error unless the ambient temperature of the environment is carefully regulated.

My prior U.S. Pat. No. 3,368,076 discloses an improved radiometer which avoids these disadvantages of the existing radiometers described above. This improved radiometer has an internally blackend conical thermal receptor or receptor cone, the apex end of which is attached to a heat sink. The heat sink maintains the apex end of the cone at an equilibrium temperature, while the radiation incident on the inner cone surface heats the cone. A temperature gradient or differential proportional to the incident radiation flux on the cone is thereby established between the cone ends. This temperature differential is sensed by thermocouples, thermistors, resistance thermometer coils, or the like to provide an electrical output which is the analog of the incident radiation flux.

SUMMARY OF THE INVENTION

The radiometer of the present invention is an improvement on that of my prior U.S. Pat. No. 3,368,076. The present improved radiometer has a hollow heat sink body of generally cylindrical cross-section with a rear end closed by an endwall and a front end containing a coaxial opening. Within the heat sink body is an internally blackened conical thermal receptor or receptor cone having an open base end and an opposite apex end. The base end of the receptor cone is positioned within and secured to the edge surface of the front opening in the heat sink body. The apex end of the cone extends rearwardly through the body in radially spaced relation to the surrounding annular body wall and terminates in spaced relation to the rear body wall.

In use, the radiometer is directed toward a radiation source to be measured so that radiation from the source enters the receptor cone through its open base end. The entering or incident radiation is absorbed by the blackened interior surface of and heats the cone. The annular region of contact between the base of the cone and the surrounding edge of the opening in the heat sink body provides a thermal conduction path between the cone and heat sink so that a temperature gradient is established between the base of the cone and its apex. Thus, energy absorbed by the cone is conducted to the heat sink and a temperature difference is established between the cone base and the cone apex. This temperature differential represents, i.e., a function of, the intensity of the radiation from the radiant source, and is measured to provide an electrical output which is the analog of the temperature difference and hence the incident radiation intensity or flux. The present improved radiometer is characterized by a rugged construction, high sensitivity, and rapid response.

DESCRIPTION OF THE PREFERRED EMBODIMENTS

Figure 1:
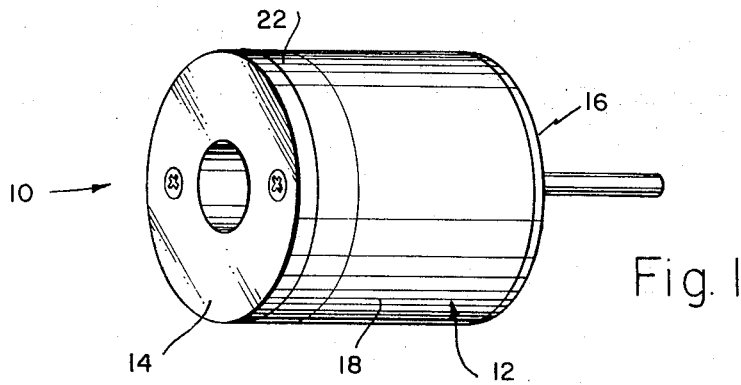
FIG. 1 is a perspective view of an improved conical cavity radiometer according to the invention.
Figure 2:
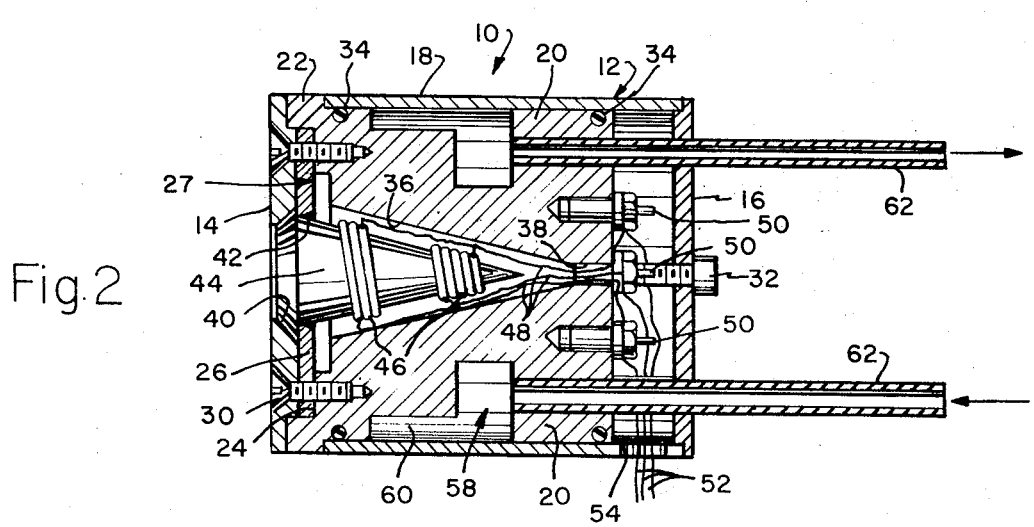
FIG. 2 is a longitudinal section through the radiometer.
Figure 3:
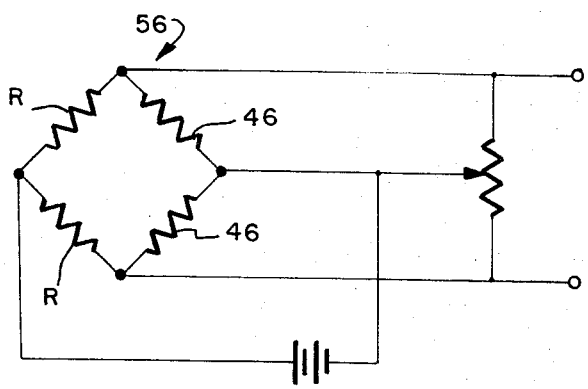
FIG. 3 is a circuit diagram of the radiometer and an electrical bridge circuit used therewith.

The conical cavity radiometer 10 selected for illustration in the drawings has a hollow, generally cylindrical housing 12 with front and rear endwalls 14, 16 and an intervening cylindrical wall or sleeve 18. Within the housing is a relatively massive heat sink body 20 constructed of a metal with a relatively high coefficient of thermal conductivity. About the front end of the heat sink body is an annular lip or flange 22 which projects outwardly between the front wall 14 and sleeve 18. Entering the front face of the heat sink body 20 is a coaxial recess 24 containing a washer or plate 26 constructed of a metal with a relatively high coefficient of thermal conductivity. Plate 26 seats rearwardly against the body so that the body and plate together constitute a heat sink 27. The front housing wall 14 has a rear portion which projects into the body recess 24 and seats rearwardly against the plate 26. The endwalls 14, 16, sleeve 18, heat sink body 20, and plate 26 are rigidly joined to form a unitary radiometer structure by front screws 30 and rear bolts 32 threaded in the body.

The rear end of the heat sink body 20 is spaced from the rear housing wall 16. The body is sealed to the housing sleeve 18 by O-rings 34 about the ends of the body.

Entering the front end of the heat sink body 20 and extending rearwardly therethrough is a rearwardly convergent conical chamber 36. The rear end of this chamber continues in a passage 38 which opens through the rear end of the body.

Front housing wall 14 contains a tapered, rearwardly divergent aperture 40 and plate 26 a tapered rearwardly convergent opening 42. Chamber 36, passage 38, aperture 40, and opening 42 are coaxially aligned on the central axes of the housing 12. The small diameter of the aperture 40 approximates the large diameter of the opening 42. The opening has the same taper angle as the chamber 36 and a large diameter less than the large diameter of the chamber.

Extending through the plate opening 42 and heat sink body chamber 36 is a conical thermal receptor or receptor cone 44. The open large diameter front or base end of the cone 44 fits snugly within and is brazed or otherwise secured to the edge surface of the opening. A thermal conduction path is thereby established between the base end of the cone and the heat sink 27. The rear apex end of the cone extends rearwardly and concentrically through the conical chamber 36 of the heat sink body 20 in radially spaced relation to the chamber wall and terminates in spaced relation to the rear end of the chamber. The interior surface of the cone is blackened.

In use, the radiometer 10 is directed toward a radiation source to be measured so that radiation from the source enters the interior of the receptor cone 44 through the front radiometer aperture 40 and the open front or base end of the cone. The incoming radiation entering the cone impinges the blackened inner surface of and is absorbed by the cone wall. The cone is thereby heated by the incident radiation. Because of the thermal conduction path between the base end of the cone and heat sink 27, heat flows by conduction from the cone base to the heat sink which thus maintains the base at an equilibrium temperature. Accordingly, a thermal gradient or temperature differential is established between the base and apex ends of the cone. This gradient or differential is a function of the incident radiation intensity or flux.

Attached to the receptor cone 44 are thermal sensors 46 for sensing the temperature gradient or differential along the cone. A variety of thermal sensors may be employed for this purpose such as thermocouples, thermistors, or resistance thermometer windings. The particular sensors shown are resistance thermometer coils whose leads 48 extend through the rear passage 38 of the heat sink chamber 36 and attach to terminal posts 50 at the rear end of the heat sink body 20. Also attached to these terminal posts are leads 52 which extend through an opening 54 in the radiometer housing sleeve 18 to an electrical bridge 56. Coils 46 are connected in the bridge, through the leads 52, in the usual manner such that the bridge produces an electrical output which represents, i.e., is a function or electrical analog of, the temperature gradient or differential between the ends of the receptor cone 44 and hence an electrical analog of the radiation intensity or flux incident on the cone.

The radiometer shown includes cooling means 58 for circulating a coolant, such as water, at constant temperature in heat transfer relation to the heat sink 27 so as to adapt the radiometer for prolonged exposure to a relatively high intensity radiation source. Cooling means 58 comprises an annular passage 60 about the heat sink body 20 and conducts 62 for conducting a coolant to and from the passage. The O-rings 34 seal the body 20 to the housing sleeve 18 to prevent leakage of coolant from the passage.

An actual working model of the illustrated radiometer had been constructed and tested. This radiometer had a receptor cone 44 constructed of 0.001-inch thick pure silver sheet with an apex angle of 24° and a base diameter of 0.375-inch. The base of the silver cone was soldered to a 0.060-inch thick copper washer 26. Two resistance thermometer coils 46 of 0.001-inch diameter nickel-iron alloy wire (temperature resistance coefficient — 2,500 ppm/°F), each having a room temperature resistance of 285 ohms, were wound on the external surface of the cone near its apex and base. These coils, connected as adjacent arms of a Wheatstone bridge 56, were the transducing elements for measuring the temperature gradient of the cone.

Tests of this instrument show that its sensitivity is 0.086 millivolts per milliwatt/cm$^2$ incident flux density; or in more general terms, a responsivity of 0.15 volt/watt. The time to reach 63 percent of a step input change was 1 second.

In the normal laboratory environment, the output stability of the detector, without a window, was ±5 microvolts, which is equivalent to an input flux variation of approximately 60 microwatts/cm$^2$. On this basis, the lowest flux level which the instrument can measure with a precision of 1 percent is 6 milliwatts/cm$^2$.

The linearity of the experimental radiometer was examined by means of the "filter in-filter out" successive step technique. Over an input flux range of 1.5 to 850 milliwatts/cm$^2$, the output of the instrument was found to be linear.

The present radiometer has several advantages over the prior art radiometers. Among the foremost of these are a rugged construction, relatively rapid response, relatively high sensitivity, and relative insensitivity to the ambient thermal environoment. In connection with the rugged construction of the instrument, it is obvious that attachment of the base end of the receptor cone to the heat sink results in a very rigid assembly capable of withstanding relatively severe shock and vibration forces. Moreover, attachment of the base end of the cone to the heat sink enhances the sensitivity and response of the instrument to the incident radiation for the reason that both the heat sink and the incident radiation tend to establish thermal gradients in the same direction in the receptor cone. That is, both tend to establish a high temperature at the apex end of the cone and a low temperature at the base end of the cone. Finally with regard to insensitivity of the instrument to its thermal environment, the heat sink body so serves the dual function of a heat sink and a shield which isolates the receptor cone from ambient air currents and convection currents.

What is claimed as new in support of Letters Patent is:

1. In a conical cavity radiometer, the combination comprising:
   a thermal receptor cone having an open base end and an opposite apex end;
   a heat sink disposed in thermally conductive relation to said base end of said cone including a hollow thick-walled heat sink body having a central chamber containing said cone in a manner such that said body completely surrounds said cone circumferentially from its base end to its apex end; and
   the portion of said cone rearwardly of said base end being spaced from the wall of said chamber.

2. A radiometer according to claim 1 including:
   means for circulating a coolant in heat transfer relation to said heat sink.

3. In a conical cavity radiometer, the combination comprising:
   a thermal receptor cone having an open base end and an opposite apex end;
   a heat sink disposed in thermally conductive relation to said base end of said cone including a hollow thick-walled heat sink body having a central chamber containing said cone in a manner such that said body completely surrounds said cone circumferentially from its base end to its apex end;
   the portion of said cone rearwardly of said base end being spaced from the wall of said chamber;
   means for circulating a coolant in heat transfer relation to said heat sink; and
   means for producing an electrical output representing the temperature difference between the ends of said cone.

* * * * *